US008935411B2

(12) United States Patent
Palin et al.

(10) Patent No.: US 8,935,411 B2
(45) Date of Patent: Jan. 13, 2015

(54) METHOD AND APPARATUS FOR UTILIZING ADVERTISEMENTS TO PROVIDE INFORMATION REGARDING CONNECTION SETUP

(75) Inventors: Arto Palin, Viiala (FI); Jukka Reunamaki, Tampere (FI)

(73) Assignee: Nokia Corporation, Espoo (FI)

( * ) Notice: Subject to any disclaimer, the term of this patent is extended or adjusted under 35 U.S.C. 154(b) by 123 days.

(21) Appl. No.: 13/591,740

(22) Filed: Aug. 22, 2012

(65) Prior Publication Data
US 2014/0059235 A1 Feb. 27, 2014

(51) Int. Cl.
G06F 15/16 (2006.01)
(52) U.S. Cl.
USPC .......................................... 709/227; 709/228
(58) Field of Classification Search
CPC ...................... H04L 29/06326; H04L 41/0806
USPC .................................................. 709/227, 228
See application file for complete search history.

(56) References Cited

U.S. PATENT DOCUMENTS

| | | | |
|---|---|---|---|
| 6,892,052 B2 | 5/2005 | Kotola et al. | |
| 7,319,845 B2 * | 1/2008 | Sugikawa | 455/41.2 |
| 7,565,108 B2 | 7/2009 | Kotola et al. | |
| 2003/0012173 A1 * | 1/2003 | Rune | 370/344 |
| 2003/0092386 A1 * | 5/2003 | Miklos et al. | 455/41 |
| 2003/0228842 A1 | 12/2003 | Heinonen et al. | |
| 2004/0176032 A1 | 9/2004 | Kotola et al. | |
| 2005/0117552 A1 * | 6/2005 | Mikkelsen | 370/336 |
| 2009/0070472 A1 * | 3/2009 | Baldus et al. | 709/227 |
| 2010/0130131 A1 * | 5/2010 | Ha et al. | 455/41.3 |
| 2011/0021142 A1 * | 1/2011 | Desai et al. | 455/41.2 |
| 2012/0196534 A1 | 8/2012 | Kasslin et al. | |
| 2012/0300812 A1 * | 11/2012 | Ly-Gagnon et al. | 375/135 |
| 2013/0288604 A1 * | 10/2013 | Chang et al. | 455/41.2 |

OTHER PUBLICATIONS

European Search Report for Application No. EP 13 17 7557 dated Jan. 2, 2014.
Decuir, J.; "*Bluetooth 4.0: Low Energy*;" CSR; dated 2010.
Donovan, J.; "*Bluetooth Goes Ultra-Low-Power*;" Wireless Solutions—DigiKey Technology Zones; retrieved on Jul. 18, 2013 from <http://www.digikey.com/us/en/techzone/wireless/resources/articles/bluetooth-goes-ultra-low-power.html>.

(Continued)

*Primary Examiner* — Tammy Nguyen
*Assistant Examiner* — Jonathan Bui
(74) *Attorney, Agent, or Firm* — Alston & Bird LLP

(57) ABSTRACT

A method, apparatus and computer program product are provided for reducing the time required for connection setup including, but not limited to, the time required for connection setup for devices discovered utilizing a low energy technology. In the context of a method performed by a slave device to be discovered, an advertisement may be generated including an indication of a capability to perform a predefined type of connection setup for initiating wireless communications. The method also causes the advertisement to be transmitted and receives a response to the advertisement from another device including one or more parameters relating to the predefined type of connection setup. The method also supports the connection setup with the another device in accordance with the one or more parameters. Corresponding apparatus and computer program products as employed by both master and slave devices are also provided.

22 Claims, 12 Drawing Sheets

(56) References Cited

OTHER PUBLICATIONS

Donovan, J.; "*Bluetooth Low-Energy: An Introduction*;" Low-Power Wireless; dated 2010; retrieved on Jul. 18, 2013 from <http://low-powerwireless.com/blog/2010/07/08/Bluetooth-low-energy-an-introduction/>.

Galeev, M.; "*Bluetooth 4.0: An introduction to Bluetooth Low Energy—Part I*;" EE Times, Design; dated Jul. 18, 2013; retrieved on Jun. 20, 2012 from <http://www.eetimes.com/design/communications-design/4217866/Bluetooth-4-0--An-introduction-to-Bluetooth-Low-Energy-Part-I>.

Galeev M.; "*Bluetooth 4.0: An introduction to Bluetooth Low Energy—Part II*;" EE Times, Design; dated Jul. 28, 2011; retrieved on Jul. 18, 2013 from <http://www.eetimes.com/design/communications-design/4218319/Bluetooth-4-0--An-introduction-to-Bluetooth-Low-Energy-Part-II>.

"*About Bluetooth Low Energy Technology*;" Bluetooth®, Technical Information; retrieved on Jul. 18, 2013 from <http://www.bluetooth.com/Pages/low-energy-tech-info.aspx>.

Office Action for U.S. Appl. No. 13/591,791 dated Jun. 20, 2014.

\* cited by examiner

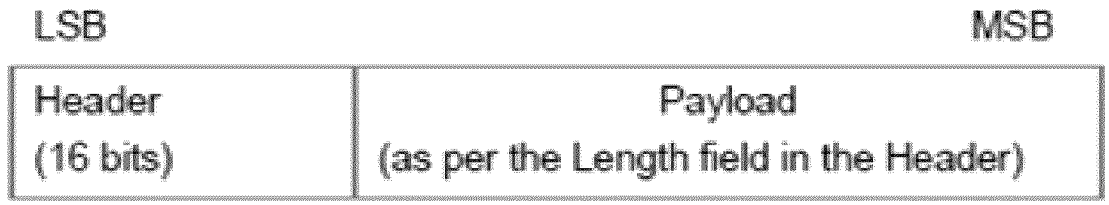
FIG. 5
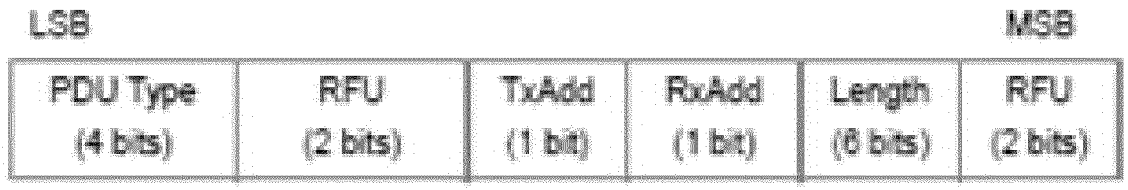
FIG. 6
| PDU Type $b_3b_2b_1b_0$ | Packet Name |
|---|---|
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |
FIG. 7

| Advertising Event Type | PDU used in this advertising event type | Allowable response PDUs for advertising event | |
|---|---|---|---|
| | | SCAN_REQ | CONNECT_REQ |
| Connectable Undirected Event | ADV_IND | YES | YES |
| Connectable Directed Event | ADV_DIRECT_IND | NO | YES* |
| Non-connectable Undirected Event | ADV_NONCONN_IND | NO | NO |
| Scannable Undirected Event | ADV_SCAN_IND | YES | NO |

FIG. 8

| Value | Description | Bit | Information |
|---|---|---|---|
| 0x01 | Flags | 0 | LE Limited Discoverable Mode |
| | | 1 | LE General Discoverable Mode |
| | | 2 | BR/EDR Not Supported (i.e. bit 37 of LMP Extended Feature bits Page 0) |
| | | 3 | Simultaneous LE and BR/EDR to Same Device Capable (Controller) (i.e. bit 49 of LMP Extended Feature bits Page 0) |
| | | 4 | Simultaneous LE and BR/EDR to Same Device Capable (Host) (i.e. bit 66 of LMP Extended Feature bits Page 1) |
| | | 5..7 | Reserved |

FIG. 10

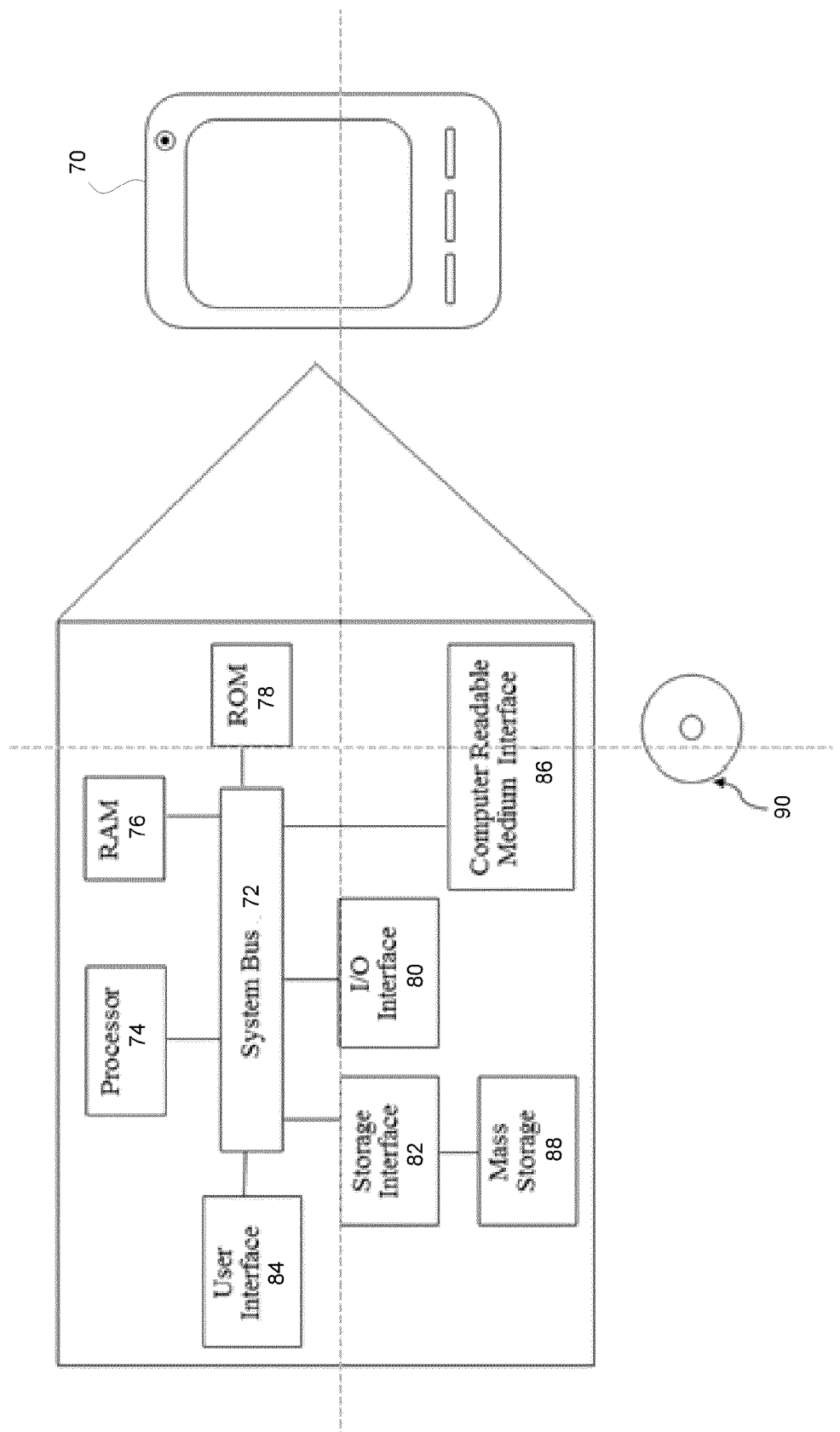

METHOD AND APPARATUS FOR UTILIZING ADVERTISEMENTS TO PROVIDE INFORMATION REGARDING CONNECTION SETUP

TECHNOLOGICAL FIELD

An example embodiment of the present invention relates generally to connection setup and, more particularly, to the use of advertisements to provide information regarding connection setup.

BACKGROUND

Bluetooth is a proprietary open wireless technology for exchanging data over short distances and may be utilized to connect two or more devices for communication therebetween. In order to connect Bluetooth devices, a connection setup procedure must be performed with one device, referred to as a master device, being in a page mode in an effort to connect with another device, referred to as a slave device, that is to be connected by performing a page scan. As shown in FIG. 1, the master device may transmit a page packet, also known as an identification (ID) packet, which includes the device access code (DAC) of the slave device. The slave device that is to be connected periodically performs a scan for page packets transmitted by other devices in proximity therewith. In an instance in which the slave device detects a page packet with its own DAC, the slave device may respond with an ID packet which consists of the DAC of the slave device. The master device then sends a frequency hop synchronization (FHS) packet to the slave device, when then responds with the ID packet. The master device may then transmit its first traffic, which may be a POLL-type of packet.

In an effort to reduce power consumption and channel occupancy associated with a Bluetooth device discovery and connection setup that is triggered autonomously instead of by a user, a Bluetooth Basic Rate (BR)/Enhanced Data Rate (EDR) connection may be formedonly in an instance in which device discovery has been conducted utilizing Bluetooth Low Energy (LE) technology. In this regard, Bluetooth LE device discovery utilizes three channels that are dedicated for advertising functions, thereby permitting devices to be discovered while consuming less power. Upon connection request, these same three channels may be utilized for the initial connection parameter exchange. Once a device is discovered and connection is initiated, regular data channels are used for communication. However, a Bluetooth BR/EDR connection setup may take an undesirably lengthy period of time, thereby slowing the establishment of a Bluetooth connection and reducing the user experience.

BRIEF SUMMARY

A method, apparatus and computer program product are provided according to an example embodiment for reducing the time required for connection setup for initiating wireless communications including, but not limited to, the time required for connection setup for devices discovered utilizing a low energy technology. By reducing the time required for setup, the method, apparatus and computer program product of some embodiments may allow for connections to be established more quickly, thereby potentially improving the user experience.

In one embodiment, a method is provided that includes generating an advertisement, with an apparatus, including an indication of a capability to perform a predefined type of connection setup for initiating wireless communications. The method of this embodiment also causes transmission of the advertisement and receives a response to the advertisement from another device including one or more parameters relating to the predefined type of connection setup. In this embodiment, the method also conducts the connection setup for initiating wireless communications with the another device in accordance with the one or more parameters.

In regards to the response that is received, the method of one embodiment may receive a response that includes a time until commencement of paging. In this embodiment, the method may also cause a page scan to be performed in accordance with the time that was provided with the response and receive a page during the page scan. The method of one embodiment may generate the advertisement by generating the advertisement so as to include information regarding a page scan to be performed. In this regard, the information regarding the page scan may include one or more of an indication as to whether the page scan is interlaced, a scanning frequency, a page scan start time or a page scan window.

In another embodiment, an apparatus is provided that includes at least one processor and at least one memory including computer program code with the at least one memory and the computer program code configured to, with the at least one processor, cause the apparatus at least to generate an advertisement including an indication of a capability to perform a predefined type of connection setup for initiating wireless communications. The at least one memory and the computer program code may also be configured to, with the at least one processor, cause the apparatus to cause transmission of the advertisement and to receive a response to the advertisement from another device including one or more parameters relating to the predefined type of connection setup. The at least one memory and the computer program code of this embodiment are also configured to, with the at least one processor, cause the apparatus to conduct the connection setup for initiating wireless communications with the another device in accordance with the one or more parameters.

In regards to the response that is received, the at least one memory and the computer program code of one embodiment may also be configured to, with the at least one processor, cause the apparatus to receive a response that includes a time until commencement of paging. In this embodiment, the at least one memory and the computer program code may also be configured to, with the at least one processor, cause the apparatus to cause a page scan to be performed in accordance with the time that was provided with the response and to receive a page during the page scan. The at least one memory and the computer program code of one embodiment may also be configured to, with the at least one processor, cause the apparatus to generate the advertisement by generating the advertisement so as to include information regarding a page scan to be performed. In this regard, the information regarding the page scan may include one or more of an indication as to whether the page scan is interlaced, a scanning frequency, a page scan start time or a page scan window.

In a further embodiment, a computer program product is provided that includes at least one non-transitory computer-readable storage medium having computer-executable program code stored therein with the computer-executable program code including program code for generating an advertisement including an indication of a capability to perform a predefined type of connection setup for initiating wireless communications. The computer-executable program code of this embodiment also include program code for causing transmission of the advertisement and program code for receiving a response to the advertisement from another device including one or more parameters relating to the predefined type of connection setup. In this embodiment, the computer-executable program code also include program code for conducting the connection setup for initiating wireless communications with the another device in accordance with the one or more parameters.

In yet another embodiment, an apparatus is provided that includes means for generating an advertisement including an indication of a capability to perform a predefined type of connection setup for initiating wireless communications. The apparatus of this embodiment also includes means for causing transmission of the advertisement and means for receiving a response to the advertisement from another device including one or more parameters relating to the predefined type of connection setup. In this embodiment, the apparatus also includes means for conducting the connection setup for initiating wireless communications with the another device in accordance with the one or more parameters.

In one embodiment, a method is provided that includes receiving an advertisement from another device including an indication of a capability to perform a predefined type of connection setup for initiating wireless communications. The method of this embodiment also generates, by an apparatus, a response to the advertisement including one or more parameters relating to the predefined type of connection setup. The method of this embodiment also causes transmission of the response to the advertisement and conducts the connection setup for initiating wireless communications with the another device in accordance with the one or more parameters.

The method of one embodiment may generate the response by generating a response that includes a time until commencement of paging. In this regard, the method may cause transmission of a page in accordance with the time that was provided with the response. In one embodiment, the method may receive the advertisement by receiving the advertisement that includes information regarding a page scan to be performed. The information regarding the page scan may include one or more of an indication as to whether the page scan is interlaced, a scanning frequency, a page scan start time or a page scan window.

In another embodiment, an apparatus is provided that includes at least one processor and at least one memory including computer program code configured to, with the at least one processor, cause the apparatus at least to receive an advertisement from another device including an indication of a capability to perform a predefined type of connection setup for initiating wireless communications. The at least one memory and the computer program code of one embodiment are also configured to, with the at least one processor, cause the apparatus to generate a response to the advertisement including one or more parameters relating to the predefined type of connection setup. The at least one memory and the computer program code of one embodiment are also configured to, with the at least one processor, cause the apparatus to cause transmission of the response to the advertisement and to conduct the connection setup for initiating wireless communications with the another device in accordance with the one or more parameters.

The at least one memory and the computer program code of one embodiment may be configured to, with the at least one processor, cause the apparatus to generate the response by generating a response that includes a time until commencement of paging. In this regard, the at least one memory and the computer program code may be configured to, with the at least one processor, cause the apparatus to cause transmission of a page in accordance with the time that was provided with the response. In one embodiment, the at least one memory and the computer program code may be configured to, with the at least one processor, cause the apparatus to receive the advertisement by receiving the advertisement that includes information regarding a page scan to be performed. The information regarding the page scan may include one or more of an indication as to whether the page scan is interlaced, a scanning frequency, a page scan start time or a page scan window.

In a further embodiment, a computer program product is provided that includes at least one non-transitory computer-readable storage medium having computer-executable program code stored therein with the computer-executable program code including program code for receiving an advertisement from another device including an indication of a capability to perform a predefined type of connection setup for initiating wireless communications. The computer-executable program code of this embodiment also include program code for generating a response to the advertisement including one or more parameters relating to the predefined type of connection setup. The computer-executable program code also include program code for causing transmission of the response to the advertisement and program code for conducting the connection setup for initiating wireless communications with the another device in accordance with the one or more parameters.

In yet another embodiment, an apparatus is provided that includes means for receiving an advertisement from another device including an indication of a capability to perform a predefined type of connection setup for initiating wireless communications. The apparatus of this embodiment also includes means for generating a response to the advertisement including one or more parameters relating to the predefined type of connection setup. The apparatus of this embodiment also includes means for causing transmission of the response to the advertisement and means for conducting the connection setup for initiating wireless communications with the another device in accordance with the one or more parameters.

BRIEF DESCRIPTION OF THE DRAWINGS

Figure 1:
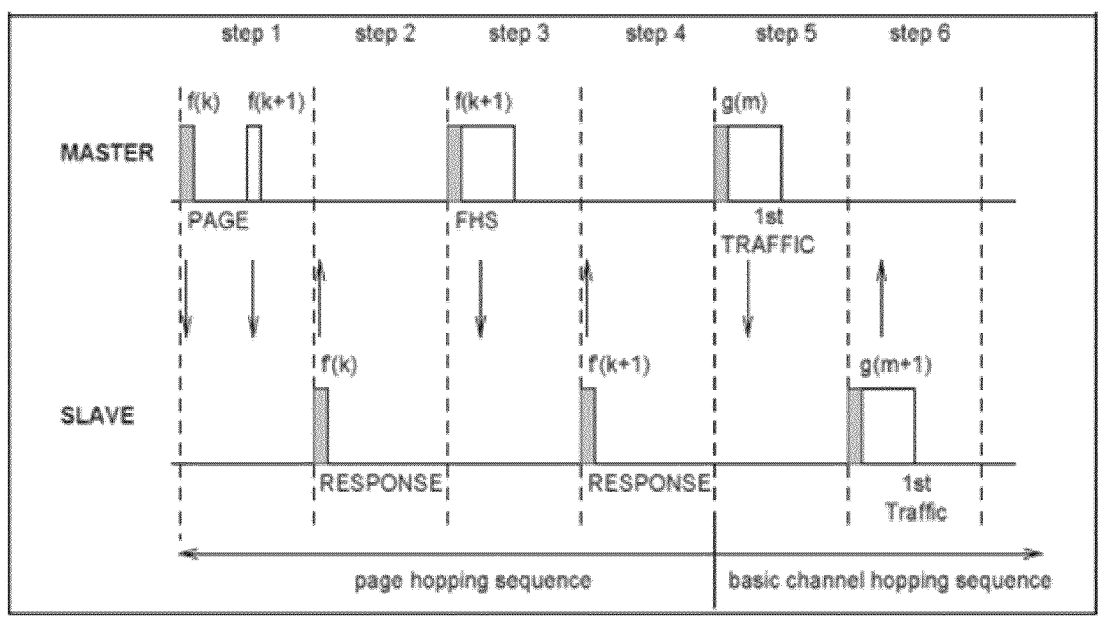
Figure 2:
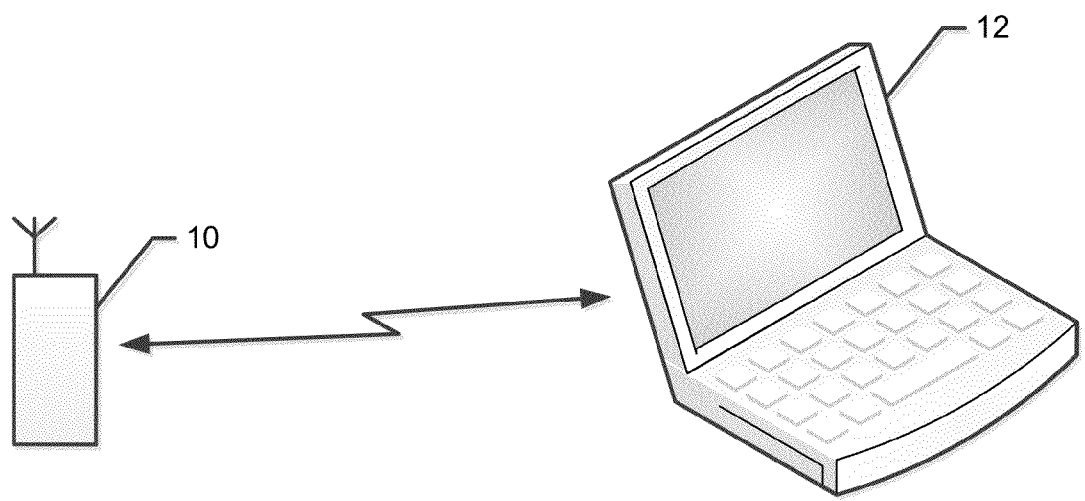
Figure 3:
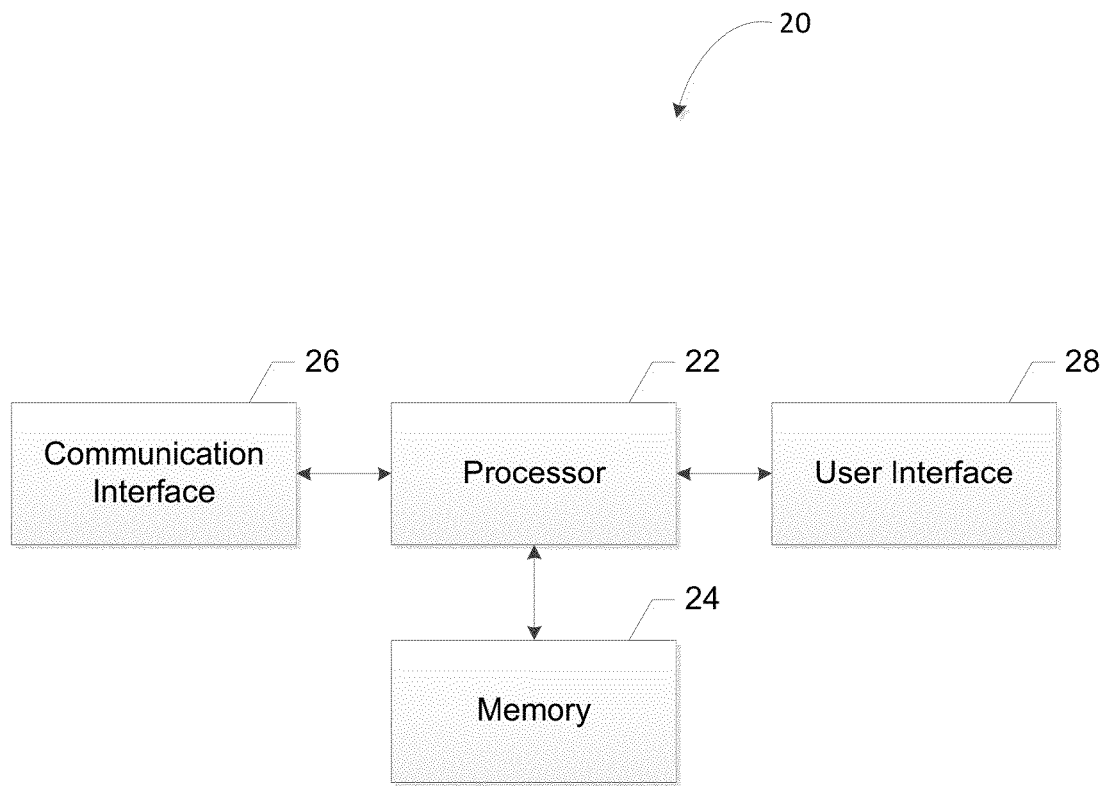
Figure 4:
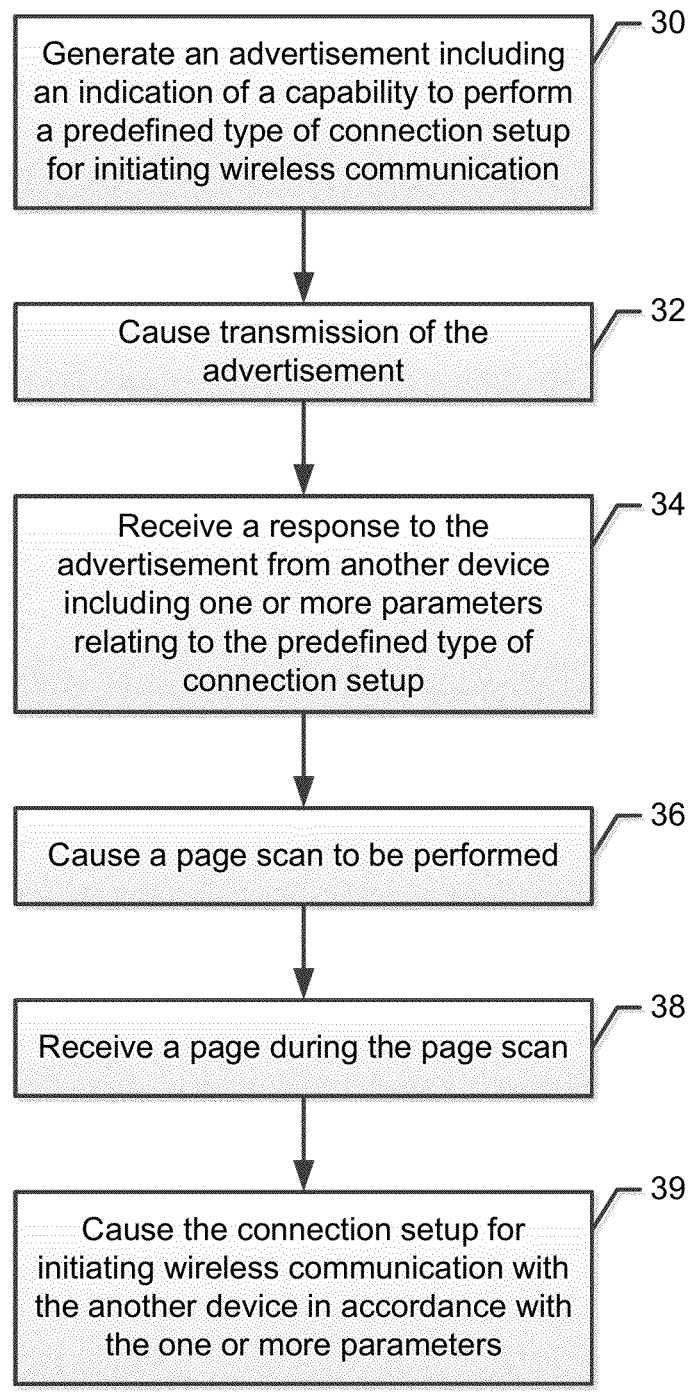
Figure 9:
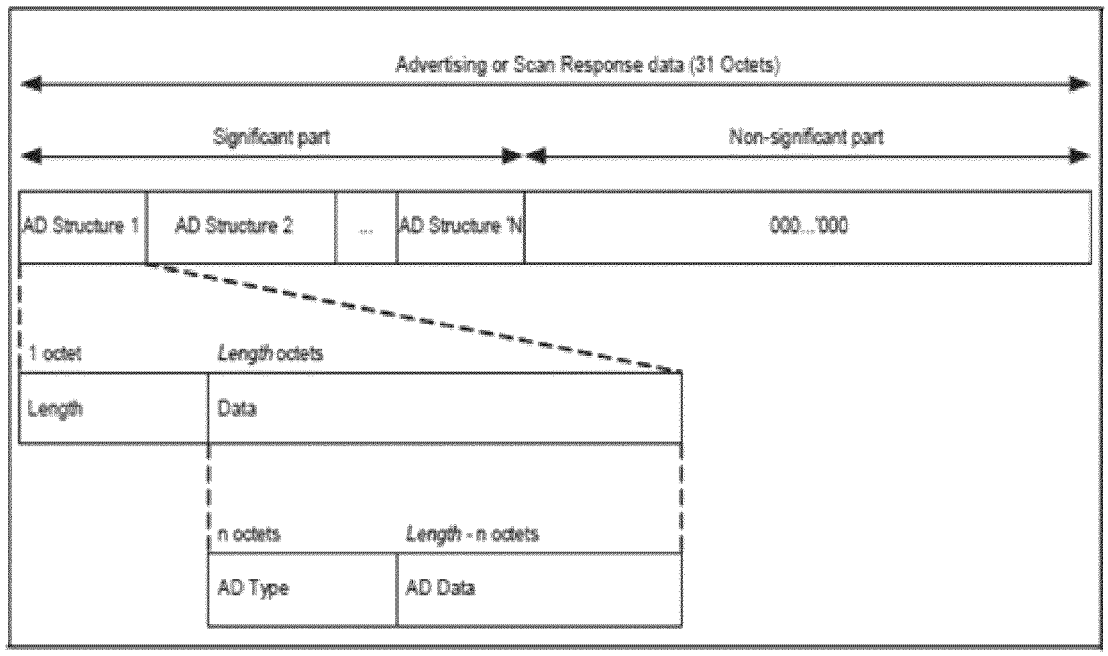
Figure 11:
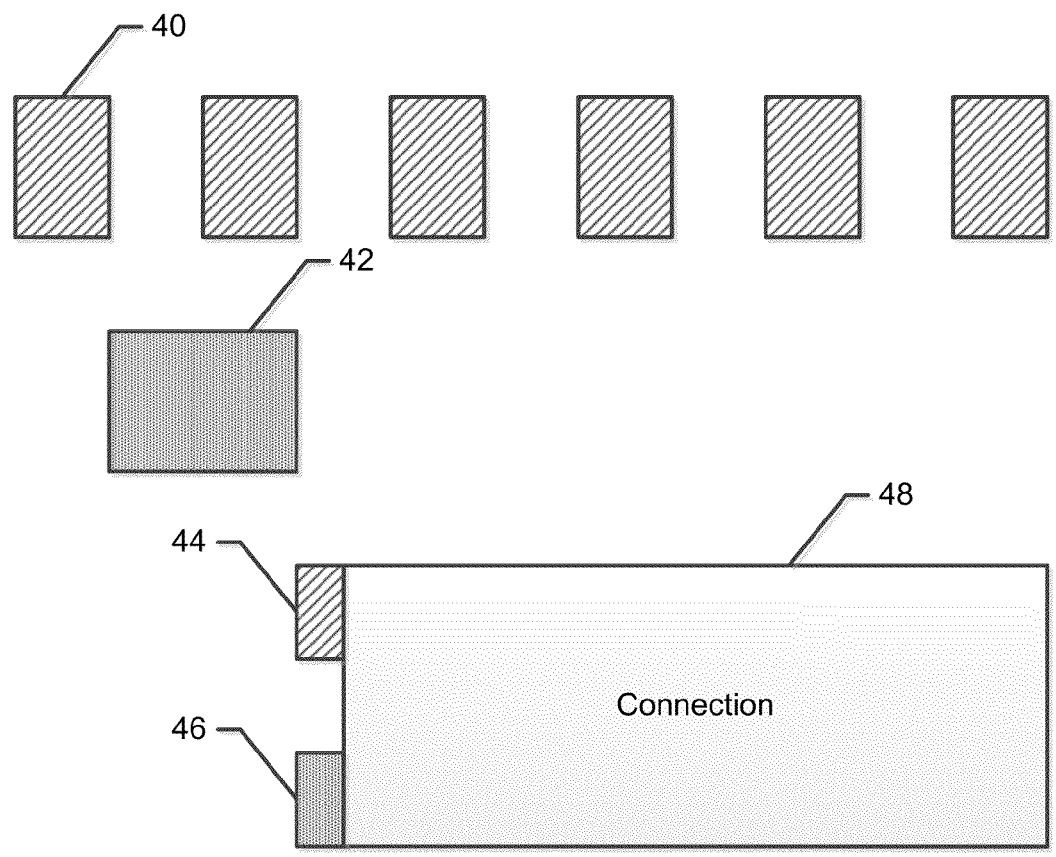
Figure 12:
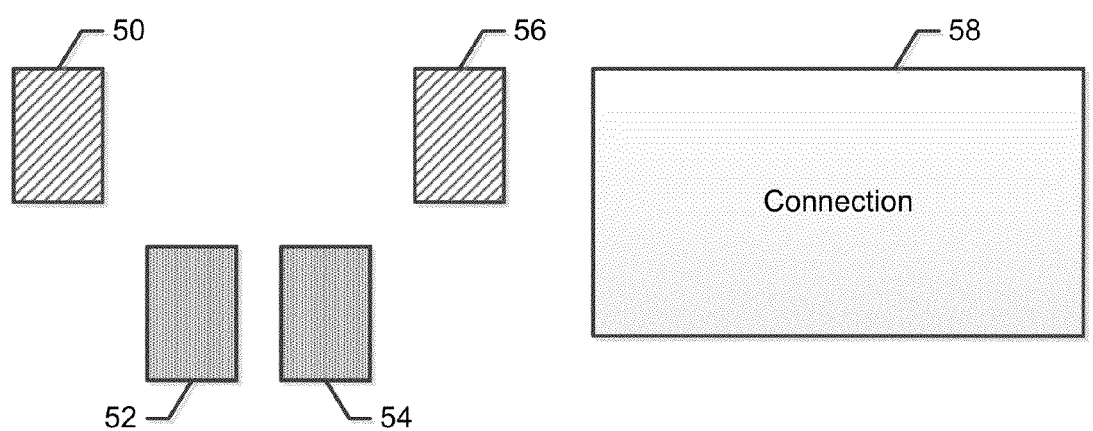
Figure 13:
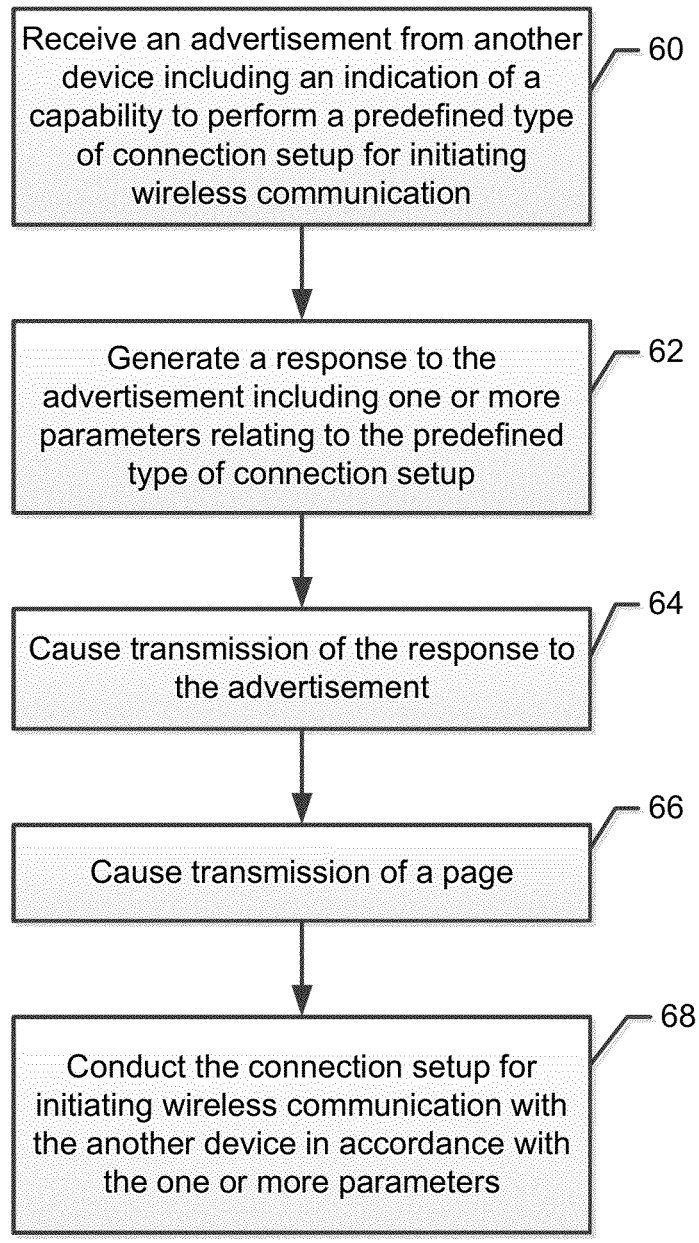

Having thus described example embodiments of the present disclosure in general terms, reference will now be made to the accompanying drawings, which are not necessarily drawn to scale, and wherein:

FIG. 1 is a timing diagram relating to Bluetooth connection establishment from Version 4.0 of the Bluetooth Core Specification;

FIG. 2 illustrates a pair of devices in proximity to one another that are capable of being connected, such as in accordance with a Bluetooth connection establishment scheme;

FIG. 3 is a block diagram of an apparatus that may be specifically configured in accordance with an example embodiment of the present invention and that may be embodied by either a master device or a slave device during connection setup;

FIG. 4 is a flow chart illustrating the operations performed by an apparatus embodied by a slave device during connection setup in accordance with an embodiment of the present invention;

FIG. 5 illustrates the format of a packet data unit (PDU) of an advertising channel in accordance with the Bluetooth Core Specification Version 4.0;

FIG. 6 illustrates the format of the header of an advertising channel PDU in accordance with the Bluetooth Core Specification Version 4.0;

FIG. 7 illustrates the PDU types of an advertising channel in accordance with the Bluetooth Core Specification Version 4.0;

FIG. 8 illustrates the allowed responses for various PDU types of an advertising channel in accordance with the Bluetooth Core Specification Version 4.0;

FIG. 9 is an example of the format that may be utilized in accordance with advertising data and scan response data in accordance with the Bluetooth Core Specification Version 4.0;

FIG. 10 is an illustration of the format of flags type of Advertisement (AD) structure in accordance with the Bluetooth Core Specification Version 4.0;

FIG. 11 is an illustration of a Bluetooth connection setup procedure in accordance with an example embodiment of the present invention;

FIG. 12 is an illustration of a Bluetooth connection setup procedure in accordance with another example embodiment of the present invention;

FIG. 13 is a flow chart illustrating the operations to be performed by an apparatus embodied by a master device during connection setup in accordance with an example embodiment of the present invention; and FIG. 14 is a representation of a computer that may be specifically configured in accordance with an example embodiment of the present invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory, physical storage medium (e.g., volatile or non-volatile memory device), can be differentiated from a "computer-readable transmission medium," which refers to an electromagnetic signal.

A method, apparatus and computer program product of an example embodiment may provide for connection setup between devices, such as devices in proximity to one another that were discovered autonomously as opposed to or in addition to those discovered in response to a user triggered device discovery process. In this regard, the method, apparatus and computer program product of an example embodiment will be described in conjunction with the connection setup between Bluetooth devices. However, the method, apparatus and computer program product may be employed in conjunction with devices configured to communicate in accordance with other protocols including, but not limited, to connection setup between devices configured to communicate in accordance with a WLAN, WiFi or the like. As such, reference to the Bluetooth protocol herein is provided by way of an example, but not of limitation.

Referring now to FIG. 2, a pair of devices are in proximity to one another such that a first device may discover a second device and thereafter perform a connection setup procedure in order to establish communications therebetween. Various types of devices may discover one another and thereafter communicate with one another including, for example, various types of fixed terminals, such as a personal computer, a computer workstation or the like, and various types of mobile terminals, such as a portable computing device, e.g., a laptop computer or a tablet computer, a mobile telephone, a personal digital assistant (PDA), a universal serial bus (USB) or other dongle, a personal computer (PC) emulator card, a pager, a mobile television, a gaming device, an electronic book reader, a camera, an audio/video player, a radio, a global positioning system (GPS) device, or any combination of the aforementioned, and other types of communications devices. The devices engaged in device discovery may be of the same type, or may be different types of devices as shown in FIG. 2 in regards to a mobile telephone 10 and a laptop computer 12. Additionally, while two devices are shown in FIG. 2 to be engaged in device discovery, the method, apparatus and computer program product of one embodiment may be equally applicable to device discovery involving three or more devices in other embodiments.

Generally, device discovery is performed with the same technology that is intended to be used in actual connection. However, some technologies provide better discovery properties than other technologies, hence, discovery and connection setup parameters can be exchanged with different technology than the actual connection. Even so, the device search and connection is built with another technique and devices are then used with another technique.

In the following discussion, a first or master device will be described to be conducting the discovery procedure in an effort to discover one or more other devices, while a second or slave device will be a device to be discovered, such as by the first device. While some devices may be specifically configured to be a master device that endeavors to discover other devices and other devices may be specifically configured to be a slave device that is to be discovered, still other devices may be configured to alternatively function as either a master device or a slave device, or as both.

As noted above, a variety of devices may engage in a device discovery process in advance of performing connection setup and establishing communications therebetween. The devices that engage in device discovery, including a master device that is conducting the device discovery process in order to discover other devices and a slave device that is to be discovered, may include, embody or otherwise be associated with an apparatus 20 that may be specifically configured in accordance with an example embodiment to the present invention as discussed hereinafter. An example embodiment of such an apparatus will now be described with reference to FIG. 3. It should be noted, however, that the devices or elements described below may not be mandatory and thus some may be omitted in certain embodiments. Referring now to FIG. 3, the apparatus of the illustrated embodiment may include or otherwise be in communication with a processor 22, a memory device 24, a communication interface 26 and a user interface 28. The memory device may comprise, for example, a non-transitory memory, such as one or more volatile and/or nonvolatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, applications, instructions or the like for enabling the apparatus to carry out various functions in accordance with example embodiments of the present invention. For example, the memory device could be configured to buffer input data for processing by the processor. Additionally or alternatively, the memory device could be configured to store instructions for execution by the processor.

The apparatus 20 may, in some embodiments, be a mobile or a fixed terminal as described above. However, in some embodiments, the apparatus may be embodied as a chip or chip set (which may in turn be employed at one of the devices mentioned above). In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry comprised thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may comprise one or more processing cores configured to perform independently. A multi-core processor may enable multiprocessing within a single physical package. Additionally or alternatively, the processor may comprise one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a computing device) adapted for employing an embodiment of the present invention by further configuration of the processor by instructions for performing the algorithms and/or operations described herein. The processor may comprise, among other things, a clock, an arithmetic logic unit (ALU) and logic gates configured to support operation of the processor.

Meanwhile, the communication interface 26 may be any means such as a device or circuitry embodied in either hardware or a combination of hardware and software that is configured to receive and/or transmit data from/to other devices. In this regard, the communication interface may comprise, for example, an antenna (or multiple antennas) and supporting hardware and/or software for enabling communications with a wireless communication network, e.g., a cellular network, a WLAN, etc. As such, for example, the communication interface may comprise a communication modem and/or other hardware/software for supporting communication via cable, digital subscriber line (DSL), USB or other mechanisms.

The user interface 28 may be in communication with the processor 22 to receive an indication of a user input at the user interface and/or to provide an audible, visual, mechanical or other output to the user. As such, the user interface may comprise, for example, a keyboard, a mouse, a joystick, a display, a touch screen(s), touch areas, soft keys, a microphone, a speaker, or other input/output mechanisms. For example, the user interface may comprise, among other devices or elements, any or all of a speaker, a microphone, a display, and a keyboard or the like. In this regard, for example, the processor may comprise user interface circuitry configured to control at least some functions of one or more elements of the user interface, such as, for example, a speaker, ringer, microphone, display, and/or the like. The processor and/or user interface circuitry comprising the processor may be configured to control one or more functions of one or more elements of the user interface through computer program instructions (e.g., software and/or firmware) stored on a memory accessible to the processor (e.g., memory device 24, and/or the like).

In order to reduce interference and power consumption associated with device discovery and to reduce the time required for connection setup, the method, apparatus and computer program product of an example embodiment may utilize an advertising channel to provide information regarding the connection setup process, such as the predefined type of connection setup process to be performed. For example, information may indicate a capability of performing a faster connection setup process, such as in comparison to a conventional connection setup process. In one embodiment that supports connection setup for Bluetooth devices, the method, apparatus and computer program product may utilize Bluetooth Low Energy (LE) as a power efficient transport mechanism by which to provide information regarding the connection setup process, such as information regarding a predefined type of connection setup process. In this regard, Bluetooth LE is defined by the Bluetooth Core Specification Version 4.0 and includes forty physical channels with three of the channels being advertising channels and the remaining thirty-seven channels being data channels. A physical channel may be sub-divided into time units known as events. Data may be transmitted between the devices in packets that are positioned in the events. There are two types of events: advertising events and connection events.

By way of further explanation, reference is made to FIG. 4 in which the operations performed by an apparatus 20 of one embodiment that is embodied by a slave device to be discovered are illustrated. In this embodiment, the apparatus embodied by the slave device may include means, such as the processor 22 or the like, for generating an advertisement, such as a low energy advertisement, including an indication of a capability to perform a predefined type of connection setup for initiating wireless communication. See block 30 of FIG. 4. Although the advertisement may include an indication of the capability of the slave device to perform various types of connection setup, the indication that is provided in conjunction with one embodiment is of a capability to perform a connection setup in accordance with a predetermined timing, such as a faster connection setup than that provided in accordance with a conventional connection setup process.

The apparatus 20 and, more particularly, the processor 22 may generate the advertisement so as to include the indication of the capability to perform a predefined type of connection setup in various manners. In one embodiment, one or more predefined bits of a packet data unit (PDU) of the advertising channel may be utilized to indicate the capability to perform the predefined type of connection setup. In this regard, FIG. 5 illustrates the PDU of an advertising channel as defined by the Bluetooth Core Specification Version 4.0. As shown, an advertising channel PDU may include a header, such as a 16-bit header, and a payload having a length that is specified by the header. As shown in FIG. 6, the format of the PDU header of the advertising channel may include a plurality of predefined fields, such as an indication of the PDU type, reserved for future use (RFU), TxAdd, RxAdd, length and RFU. Of these fields, one or more bits of an RFU field may be designated to provide indication of a capability to perform a predefined type of connection setup. For example, the predefined bit(s) of an RFU field of the advertising channel PDU header may be set to a predefined value, such as 1, in an instance in which the slave device has the capability to perform the predefined type of connection setup, such as a faster connection setup, and to be set to a different value, such as 0, in an instance in which the slave device does not include the capability to perform the predefined type of connection setup.

As indicated above, the PDU type field of an advertising channel PDU header may include various predefined types as defined by the Bluetooth Core Specification Version 4.0 and illustrated in FIG. 7. The various PDU types may serve various purposes. For example, a request packet, such as a SCAN_REQ packet, may be utilized to retrieve additional information from a slave device with the additional information being received in the scan response, that is, a response packet, such as the SCAN_RSP packet. As another example, the connection request, e.g., the CONNECT_REQ packet, is utilized to form an actual connection between devices. As shown, the Bluetooth Core Specification Version 4.0 reserves a number of PDU types and, as such, one of the reserved PDU types may be defined to provide the indication of the capability of the slave device to perform a predefined type of connection setup.

The various advertising packets may illicit certain predefined responses. For example, FIG. 8 illustrates the responses that are defined by the Bluetooth Core Specification Version 4.0 to the various advertising packets that have a prefix of ADV_.

In another example, the indication of the capability to perform the predefined type of connection setup may be included by the apparatus 20 embodied as the slave device as additional information within one or more of the advertisement (AD) structures. In this regard, the advertisement including one or more packets and the page response may be provided by the apparatus embodied by the slave device in accordance with a variety of different formats. One example of a format that may be utilized for the advertisement provided by an apparatus embodied by the slave device is shown in FIG. 9. In this embodiment, the data includes a significant part and a non-significant part. The significant part contains a sequence of AD structures. Each AD structure of this embodiment has a length field of one octet, which contains the length value, and a data field having a number of octets equal to the value of the length field. The first octet of the data field of this embodiment includes the AD type field. The content of the remaining octets in the data field depends on the value of the AD type field and may be referred to as AD data. The non-significant part extends the data to 31 octets and shall contain all zero octets. As such, only the significant part of the data needs to be transmitted. For example, in an instance in which the AD structures comprise an advertisement, the data may be transmitted in advertising events with the advertising data being placed in the ADV data field of ADV_IND, ADV_NONCONN_IND and/or ADV_SCAN_IND packets as defined by the Bluetooth Core Specification Version 4.0 and as shown in FIG. 7. Alternatively, in an instance in which the AD structures comprise a scan response, the scan response data may be sent to the ScanRspData field of the SCAN_RSP packets as also defined by the Bluetooth Core Specification Version 4.0 and shown in FIG. 7.

For example, one AD type may be associated with flags and may have a configuration as shown in FIG. 10 and is defined by the Bluetooth Core Specification Version 4.0. One or more bits of the flags AD type may be reserved, such as bits 5-7 of the embodiment illustrated in FIG. 10. In this regard, one or more of the reserved bits, such as bit 5 of the embodiment illustrated in FIG. 10, may include a flag or other indication as to whether the slave device has the capability to perform the predefined type of connection setup, such as by being set to a predefined value, such as 1, in an instance in which the slave device has the capability to perform the predefined type of connection setup and being set to a different value, such as 0, in an instance in which the slave device does not have the capability to perform the predefined type of connection setup.

In yet another embodiment, a different AD structure may be defined so as to provide the indication of a capability to perform the predefined type of connection setup. In this embodiment, a different AD type may not only be configured to provide information regarding the capability to perform a predefined type of connection setup, but may also provide additional information relating to a subsequent page scan, such as the page scan channel, the page scan type, the start time window duration, etc. For example, the different type of AD structure may include an indication as to whether the slave device has the capability to perform the predefined type of connection setup, such as a faster BR/EDR connection setup than a conventional connection setup, may include data, such as one octet of data, that includes flags indicating whether a page scan is to be interlaced, data, such as one octet of data, providing information regarding the scanning frequency of the next page, data, such as one octet of data, indicating the start time of the page scan following the completion of the request, and data, such as one octet of data, indicating the page scan window following the initiation.

As the foregoing examples illustrate, the indication of the capability of the slave device to perform a predefined type of connection setup, such as a fast connection setup, may be provided with an advertisement in a variety of different manners. Regardless of the manner in which the advertisement is generated so as to include the indication of the capability of the slave device to perform the predefined type of connection setup, the apparatus 20 embodied by the slave device also includes means, such as the processor 22, the communication interface 26 or the like, for causing transmission of the advertisement, such as in a wireless manner to proximate devices. See block 32 of FIG. 4.

In response to the advertisement that includes the indication of a capability of the slave device to perform a predefined type of activity, the apparatus 20 embodied by the slave device may include means, such as the processor 22, the communication interface 26 or the like, for receiving a response to the advertisement from another device including one or more parameters relating to the predefined type of connection setup. See block 34 of FIG. 4. In this regard, the one or more parameters relating to the predefined type of connection setup may include an indication that the other device, such as a master device, is either also capable of performing the predefined type of connection setup, such as a faster connection setup, or is incapable of performing the predefined type of connection setup. Additionally or alternatively, the parameters relating to the predefined type of connection setup that are received from the other device may include, for example, a time until commencement of paging.

The response to the advertisement and, more particularly, the one or more parameters that relate to the predefined type of connection setup that are provided in response to the advertisement may be provided in various manners. For example, a new type of PDU may be provided, such as may be defined from amongst the plurality of reserved types of PDUs, that includes one or more parameters relating to the predefined type of connection setup. For example, a new type of PDU, termed a CONNECT_BR/EDR_REQ PDU, may be designated by 0111 and may include a payload that indicates the capability of the other device, such as the master device, to perform the predefined type of connection setup and, in some embodiments, may include the time required prior to commencement of paging and potentially other parameters relating to connection setup. Alternatively, one or more of the bits of the PDU header, such as one or more RFU bits of the PDU header, may be utilized to provide one or more parameters relating to the predefined type of connection setup. For example, one or more RFU bits of a request packet type of PDU, such as a SCAN_REQ type of PDU, may be utilized to indicate that the other device, such as the master device, is capable of performing the predefined type of connection setup with another type of PDU, such as a response packet type of PDU, such as a SCAN_RSP PDU, being utilized in some embodiments to provide additional information relating to the predefined type of connection setup in order to facilitate the subsequent connection setup. Although various examples of a response to the advertisement that may include one or more parameters relating to the predefined type of connection setup have been provided, the response may be configured in other manners in other embodiments of the present invention.

The apparatus 20 embodied by the slave device may also include means, such as the processor 22, the communication interface 26 or the like, for conducting the connection setup for initiating wireless communication with the other device in accordance with one or more parameters. See block 39 of FIG. 4. For example, the apparatus embodied by the slave device may include means, such as the processor, the communication interface or the like, for causing a page scan to be performed and, in response, for receiving a page during the page scan from the other device. See blocks 36 and 28 of FIG. 4. In response to the page, the apparatus embodied by the slave device of one embodiment may also include means, such as the processor, the communication interface or the like, for causing a response to the page to be provided, such as an ID packet that serves as an acknowledgement. Regardless, following the receipt of the page by the slave device, a connection may be established between the master and slave devices, such as a BR/EDR connection.

In one embodiment in which the response to the advertisement includes a time until the commencement of paging, the page scan that is caused to be performed by the slave device may be performed in accordance with the time that was provided with response, such as by being performed at the time or within the time that was provided by the response. With respect to FIG. 11, which illustrates the communications between a master and slave device of one embodiment in conjunction with device discovery and connection setup, the slave device may issue a plurality of advertisements 40, such as LE advertisements, spaced apart from one another in accordance with a predefined timing or in accordance with a predefined frequency. The advertisements may include an indication of the capability of the slave device to perform a predefined type of connection setup. The master device may perform a scan 42 for advertisements and may provide a response to the advertisement that includes an indication that the master device has the capability to perform the predefined type of connection setup as well as one or more other parameters relating to the predefined type of connection setup. In one embodiment, the response from the master device includes the time at which paging will be commenced. The slave device may cause a page scan 44 to be performed and the master device may cause a page 46 to be transmitted in accordance with the time provided in response to the advertisement with a connection 48, such as a BR/EDR connection, then being setup.

Alternatively, in another embodiment, the connection setup may be aligned with one or more advertisements that are transmitted by the slave device. In this regard, FIG. 12 illustrates an embodiment in which the slave device causes an advertisement 50, such as an LE advertisement, to be transmitted with the advertisement including an indication as to whether the slave device is capable of performing a predefined type of connection setup. The master device of this embodiment may then respond with a CONNECT_BR/EDR_REQ response 52 to initiate the connection setup, such as by including an indication of the capability of the master device to perform the predefined type of connection setup and one or more parameters relating to the predefined type of connection setup. The roles performed by the master and slave devices during the connection setup can be determined by the exchange of the advertisement and the responsive CONNECT_BR/EDR_REQ PDU or based upon the order in which the devices transmit the initial packets for connection setup. In this regard, one of the devices, such as the master device, may transmit a FHS packet 54 with the other device, such as the slave device, transmitting an ID packet 56 for connection setup purposes, followed by connection 58.

In accordance with embodiments of the present invention including those described above, the connection setup may be established more quickly than in accordance with a conventional connection setup process as a result of the initial determination that each device is capable of the predefined type of connection setup, such as a faster type of connection setup. Indeed, the exchange between the slave and master devices of parameters, such as timing information, that are utilized in conjunction with connection setup facilitates the establishment of the connection in a more rapid basis. In one embodiment, for example, the connection setup process information 50-56 may be transmitted in accordance with one technology, such as in accordance with Bluetooth LE, and the actual connection 58 may be performed with another technology, such as Bluetooth.

Referring now to FIG. 13, the operations performed by an apparatus 20 embodied by a master device are illustrated. In this regard, an apparatus embodied by the master device may include means, such as processor 22, the communication interface 26 or the like, for receiving an advertisement from another device including an indication of a capability of the other device to perform a predefined type of connection setup for initiating wireless communication, such as a connection setup that is conducted in accordance with a predetermined timing, e.g., a faster form of connection setup. See block 60. In addition to the indication of the capability of the other device to perform the predefined type of connection setup, the advertisement may include one or more parameters relating to the device discovery and/or connection setup process, such as an indication as to whether the page scan is interlaced, the scanning frequency, a page scan start time, a page scan window and/or other information relating to the page scan. The apparatus embodied by the master device may also include means, such as the processor or the like, for generating a response to the advertisement including one or more parameters relating to the predefined type of connection setup. See block 62. As described above, the apparatus embodied by the master device may generate various types of responses including, for example, a new type of PDU and/or a PDU that includes one or more bits in the PDU header, such as one or more RFU bits in the PDU header, to indicate whether or not the master device is capable of performing the predefined type of connection setup. The one or more parameters relating to the predefined connection setup may not only include an indication as to whether the master device is capable of the predefined type of connection setup, such as a faster type of connection setup, but also one or more parameters relating to the timing associated with the connection setup, such as a time until the commencement of paging.

In response to its generation, the apparatus 20 embodied by the master device may include means, such as the processor 22, the communication interface 26 or the like, for causing transmission of the response to the advertisement. See block 64. The apparatus embodied by the master device may also include means, such as the processor, the communication interface or the like, for conducting the connection setup for initiating wireless communication with the other device, such as the slave device, in accordance with the one or more parameters. See block 68. In regards to conducting the connection setup, the apparatus embodied by the master device may include means, such as the processor, the communications interface or the like, for causing transmission of a page, such as in accordance with the time that was previously provided and that is indicative of the time until commencement of paging. See block 66. As shown in FIG. 11, the master device and the slave device may create the connection, such as a BR/EDR connection following the page. Alternatively, an ID packet and an FHS packet may be exchanged between the master and slave devices during a connection setup procedure and in order to permit subsequent connection as shown in FIG. 12.

Regardless of the manner in which the information is exchanged between the master and slave devices, the method, apparatus and computer program product of example embodiments of the present invention permit a connection setup to be performed more quickly. Thus, the efficiency of the connection setup process may be increased and the user experience may be improved.

As described above, FIGS. 4 and 13 are flowcharts of a method, apparatus and program product from the perspective of a slave device and a master device, respectively, according to example embodiments of the invention. It will be understood that each block of the flowchart, and combinations of blocks in the flowcharts, may be implemented by various means, such as hardware, firmware, processor, circuitry and/or other device associated with execution of software including one or more computer program code. For example, one or more of the procedures described above may be embodied by computer program code. In this regard, the computer program code which embodies the procedures described above may be stored by a memory device 24 of an apparatus 20 employing an embodiment of the present invention and executed by a processor 22 in the apparatus. As will be appreciated, any such computer program code may be loaded onto a computer or other programmable apparatus (e.g., hardware) to produce a machine, such that the resulting computer or other programmable apparatus embody a mechanism for implementing the functions specified in the flowchart blocks. These computer program code may also be stored in a non-transitory computer-readable storage memory (as opposed to a transmission medium such as a carrier wave or electromagnetic signal) that may direct a computer or other programmable apparatus to function in a particular manner, such that the code stored in the computer-readable memory produce an article of manufacture the execution of which implements the function specified in the flowchart blocks. The computer program code may also be loaded onto a computer or other programmable apparatus to cause a series of operations to be performed on the computer or other programmable apparatus to produce a computer-implemented process such that the code which execute on the computer or other programmable apparatus provide operations for implementing the functions specified in the flowchart block(s). As such, the operations of FIGS. 4 and 13, when executed, convert a computer or processing circuitry into a particular machine configured to perform an example embodiment of the present invention. Accordingly, the operations of FIGS. 4 and 13 define an algorithm for configuring a computer or processing circuitry (e.g., processor) to perform an example embodiment. In some cases, a general purpose computer may be configured to perform the functions shown in FIGS. 4 and 13 (e.g., via configuration of the processor), thereby transforming the general purpose computer into a particular machine configured to perform an example embodiment.

Accordingly, blocks of the flowcharts support combinations of means for performing the specified functions, combinations of operations for performing the specified functions and program instructions for performing the specified functions. It will also be understood that one or more blocks of the flowcharts, and combinations of blocks in the flowcharts, can be implemented by special purpose hardware-based computer systems which perform the specified functions or operations, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order, including concurrently and in any combination.

As described, various operations and/or the like described herein may be executed by and/or with the help of computers. Further, for example, devices described herein may be and/or may incorporate computers. The phrases "computer", "general purpose computer", "computing device" and the like, as used herein, refer but are not limited to a media device, a personal computer, an engineering workstation, a personal digital assistant, a portable computer, a computerized watch, a wired or wireless terminal, phone, node, and/or the like, a set-top box, a personal video recorder (PVR), an automatic teller machine (ATM), a game console, and/or the like.

Embodiments of the present invention may be implemented in software, hardware, application logic or a combination of software, hardware and application logic. The software, application logic and/or hardware may reside on memory 24 of apparatus 20 of FIG. 3. In an example embodiment, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 14. A computer-readable medium may comprise a computer-readable storage medium that may be any media or means that may contain or store the instructions for use by or in connection with an instruction execution system, apparatus, or device, such as a computer.

The phrases "general purpose computer", "computer", "computing device" and the like may also refer to one or more processors operatively connected to one or more memory or storage units, wherein the memory or storage may contain data, algorithms, and/or program code, and the processor or processors may execute the program code and/or manipulate the program code, data, and/or algorithms. Accordingly, example computer 70 as shown in FIG. 14 that may be considered as one embodiment of the apparatus 20 of FIG. 3 may include various hardware modules for causing the computer to implement one or more embodiments of the present invention. According to one example, the computer 70 includes a system bus 72 which may operatively connect processor 74, random access memory (RAM) 76 and read-only memory (ROM) 78 that may store, for example, a computer code for the computer 70 to perform one or more of the example methods illustrated on FIGS. 4 and 13. The system bus 72 may further operatively connect input output (I/O) interface 80, storage interface 82, user interface 84 and computer readable medium interface 86. Storage interface 82 may comprise or be connected to mass storage 88.

Mass storage 88 may be a hard drive, optical drive, or the like. Processor 74 may comprise a microcontroller unit (MCU), a digital signal processor (DSP), or any other kind of processor. Computer 70 as shown in this example also comprises a touch screen and keys operating in connection with the user interface 84. In various example embodiments, a mouse, and/or a keypad may alternately or additionally be employed. Computer 70 may additionally include the computer readable medium interface 86, which may be embodied by a card reader, a DVD drive, a floppy disk drive, and/or the like. Thus, media containing program code, for example for performing methods of FIGS. 4 and 13, may be inserted for the purpose of loading the code onto the computer.

Computer 70 may run one or more software modules designed to perform one or more of the above-described operations. Corresponding program code may be stored on a physical media 90 such as, for example, DVD, CD-ROM, and/or floppy disk. It is noted that any described division of operations among particular software modules is for purposes of illustration, and that alternate divisions of operation may be employed. Accordingly, any operations discussed as being performed by a software module may instead be performed by a plurality of software modules. Similarly, any operations discussed as being performed by a plurality of modules may instead be performed by a single module. It is noted that operations disclosed as being performed by a particular computer may instead be performed by a plurality of computers.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
generating, by an apparatus, an advertisement in accordance with Bluetooth Low Energy (LE) communication protocol including an indication of a capability to perform a Bluetooth Basic Rate/Enhanced Data Rate (BR/EDR) connection setup for initiating wireless communication;
causing transmission of the Bluetooth LE advertisement;
receiving a response to the Bluetooth LE advertisement from another device including one or more parameters relating to the Bluetooth BR/EDR connection setup; and
conducting the Bluetooth BR/EDR connection setup for initiating wireless communication with the another device in accordance with the one or more parameters.

2. A method according to claim 1 wherein receiving the response comprises receiving a response that includes a time until commencement of paging.

3. A method according to claim 2 further comprising:
causing a Bluetooth BR/EDR page scan to be performed in accordance with the time that was provided with the response; and
receiving a Bluetooth BR/EDR page during the page scan.

4. A method according to claim 1 wherein generating the Bluetooth LE advertisement comprises generating the Bluetooth LE advertisement so as to include information regarding a Bluetooth BR/EDR page scan to be performed.

5. A method according to claim 4 wherein the information regarding the Bluetooth BR/EDR page scan includes one or more of an indication as to whether the page scan is interlaced, a scanning frequency, a page scan start time or a page scan window.

6. An apparatus comprising:
at least one processor; and
at least one memory device including computer program code, the at least one memory device and the computer program code configured to, with the at least one processor, cause the apparatus to perform at least the following:
generate an advertisement in accordance with Bluetooth Low Energy (LE) communication protocol including an indication of a capability to perform a Bluetooth Basic Rate/Enhanced Data Rate (BR/EDR) connection setup for initiating wireless communication;
cause transmission of the Bluetooth LE advertisement;
receive a response to the Bluetooth LE advertisement from another device including one or more parameters relating to the Bluetooth BR/EDR connection setup; and
conduct the Bluetooth BR/EDR connection setup for initiating wireless communication with the another device in accordance with the one or more parameters.

7. An apparatus according to claim 6 wherein the at least one memory device and the computer program code are configured to, with the at least one processor, cause the apparatus to receive the response by receiving a response that includes a time until commencement of paging.

8. An apparatus according to claim 7 wherein the at least one memory device and the computer program code are further configured to, with the at least one processor, cause the apparatus to:
cause a Bluetooth BR/EDR page scan to be performed in accordance with the time that was provided with the response; and
receive a Bluetooth BR/EDR page during the page scan.

9. An apparatus according to claim 6 wherein the at least one memory device and the computer program code are configured to, with the at least one processor, cause the apparatus to generate the Bluetooth LE advertisement by generating the Bluetooth LE advertisement so as to include information regarding a Bluetooth BR/EDR page scan to be performed.

10. An apparatus according to claim 9 wherein the information regarding the Bluetooth BR/EDR page scan includes one or more of an indication as to whether the Bluetooth BR/EDR page scan is interlaced, a scanning frequency, a page scan start time or a page scan window.

11. A computer program product comprising computer executable program code recorded on a non-transitory computer readable storage medium, the computer executable program code comprising:
code for generating an advertisement in accordance with Bluetooth Low Energy (LE) communication protocol including an indication of a capability to perform a Bluetooth Basic Rate/Enhanced Data Rate (BR/EDR) connection setup for initiating wireless communication;
code for causing transmission of the Bluetooth LE advertisement;
code for receiving a response to the Bluetooth LE advertisement from another device including one or more parameters relating to the Bluetooth BR/EDR connection setup; and
code for conducting the Bluetooth BR/EDR connection setup for initiating wireless communication with the another device in accordance with the one or more parameters.

12. A method comprising:
receiving a Bluetooth Low Energy (LE) advertisement from another device including an indication of a capability to perform Bluetooth Basic Rate/Enhanced Data Rate (BR/EDR) connection setup for initiating wireless communication;
generating, by an apparatus, a response to the Bluetooth LE advertisement including one or more parameters relating to the Bluetooth BR/EDR connection setup;
causing transmission of the response to the Bluetooth LE advertisement; and
conducting the Bluetooth BR/EDR connection setup for initiating wireless communication with the another device in accordance with the one or more parameters.

13. A method according to claim 12 wherein generating the response comprises generating a response that includes a time until commencement of paging.

14. A method according to claim 13 further comprising causing transmission of a Bluetooth BR/EDR page in accordance with the time that was provided with the response.

15. A method according to claim 12 wherein receiving the Bluetooth LE advertisement comprises receiving the Bluetooth LE advertisement that includes information regarding a Bluetooth BR/EDR page scan to be performed.

16. A method according to claim 15 wherein the information regarding the Bluetooth BR/EDR page scan includes one or more of an indication as to whether the Bluetooth BR/EDR page scan is interlaced, a scanning frequency, a page scan start time or a page scan window.

17. An apparatus comprising:
at least one processor; and
at least one memory device including computer program code, the at least one memory device and the computer program code configured to, with the at least one processor, cause the apparatus to perform at least the following:
receive a Bluetooth Low Energy (LE) advertisement from another device including an indication of a capability to perform Bluetooth Basic Rate/Enhanced Data Rate (BR/EDR) connection setup for initiating wireless communication;
generate a response to the Bluetooth LE advertisement including one or more parameters relating to the Bluetooth BR/EDR connection setup;
cause transmission of the response to the Bluetooth LE advertisement; and
conduct the Bluetooth BR/EDR connection setup for initiating wireless communication with the another device in accordance with the one or more parameters.

18. An apparatus according to claim 17 wherein the at least one memory device and the computer program code are configured to, with the at least one processor, cause the apparatus to generate the response by generating a response that includes a time until commencement of paging.

19. An apparatus according to claim 18 wherein the at least one memory device and the computer program code are further configured to, with the at least one processor, cause the apparatus to cause transmission of a Bluetooth BR/EDR page in accordance with the time that was provided with the response.

20. An apparatus according to claim 17 wherein the at least one memory device and the computer program code are configured to, with the at least one processor, cause the apparatus to receive the Bluetooth LE advertisement by receiving the Bluetooth LE advertisement that includes information regarding a Bluetooth BR/EDR page scan to be performed.

21. An apparatus according to claim 20 wherein the information regarding the Bluetooth BR/EDR page scan includes one or more of an indication as to whether the Bluetooth BR/EDR page scan is interlaced, a scanning frequency, a page scan start time or a page scan window.

22. A computer program product comprising computer executable program code recorded on a non-transitory computer readable storage medium, the computer executable program code comprising:

code for receiving a Bluetooth Low Energy (LE) advertisement from another device including an indication of a capability to perform Bluetooth Basic Rate/Enhanced Data Rate (BR/EDR) connection setup for initiating wireless communication;

code for generating a response to the Bluetooth LE advertisement including one or more parameters relating to the Bluetooth BR/EDR connection setup;

code for causing transmission of the response to the Bluetooth LE advertisement; and code for conducting the Bluetooth BR/EDR connection setup for initiating wireless communication with the another device in accordance with the one or more parameters.

* * * * *